United States Patent
Shulman et al.

(10) Patent No.: US 11,700,263 B2
(45) Date of Patent: Jul. 11, 2023

(54) METHOD FOR VALIDATING OWNERSHIP OF A RESOURCE WITHIN A NETWORK, COORDINATING AGENT AND VALIDATION AGENT

(71) Applicant: Fraunhofer-Gesellschaft zur Förderung der angewandten Forschung e.V., Munich (DE)

(72) Inventors: Haya Shulman, Darmstadt (DE); Michael Waidner, Darmstadt (DE); Markus Brandt, Darmstadt (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 137 days.

(21) Appl. No.: 16/599,218

(22) Filed: Oct. 11, 2019

(65) Prior Publication Data
US 2020/0296109 A1 Sep. 17, 2020

(30) Foreign Application Priority Data
Oct. 12, 2018 (EP) .................................... 18200254

(51) Int. Cl.
*G06F 16/245* (2019.01)
*H04L 61/4511* (2022.01)
(Continued)

(52) U.S. Cl.
CPC .......... *H04L 63/104* (2013.01); *G06F 16/245* (2019.01); *H04L 47/82* (2013.01); *H04L 61/4511* (2022.05); *H04L 63/0428* (2013.01)

(58) Field of Classification Search
CPC ............. H04L 61/2007; H04L 63/0281; H04L 63/105; H04L 2209/76; H04L 63/14;
(Continued)

(56) References Cited

U.S. PATENT DOCUMENTS 9,300,625 B1 * 3/2016 Potlapally ............... H04L 63/04
9,712,381 B1 * 7/2017 Emanuel ................. H04L 43/10
(Continued)

FOREIGN PATENT DOCUMENTS

WO WO-0173553 A1 * 10/2001 ......... H04L 63/1433

OTHER PUBLICATIONS

H. Birge-Lee et al.: "Bamboozling Certificate Authorities with BGP", Proceedings of the 27th USENIX Security Symposium, Aug. 15-17, 2018, pp. 833-849, Chapter 5, XP055649673, ISBN: 978-1-931971-46-1, Retrieved from the Internet: URL:https://www.usenix.org/system/files/conference/usenixsecurityl 8/sec18-birge-lee.pdf [retrieved on Dec. 5, 2019].
(Continued)

*Primary Examiner* — Mohamed A. Wasel
*Assistant Examiner* — Linh T. Nguyen
(74) *Attorney, Agent, or Firm* — 2SPL Patentanwälte PartG mbB; Yong Beom Hwang

(57) ABSTRACT

A method to validate ownership of a resource within a network, comprising selecting a group of at least two validation agents such that network routes between a validation agent of the group and entities of a group of one or more entities associated to the resource do not intersect. The method further comprises transmitting a property of the resource to be validated and an address indicator for the resource from a coordinating agent to the group of validation agents. Also, the method comprises querying the property of the resource from the entities using the validation agents of the group to determine queried properties; and evaluating the queried properties to validate ownership of the resource.

12 Claims, 2 Drawing Sheets

(51) Int. Cl.
*H04L 9/40* (2022.01)
*H04L 47/70* (2022.01)

(58) Field of Classification Search
CPC ... H04L 51/28; H04L 63/0245; H04L 61/307;
H04L 63/0869; H04L 63/12; H04L
9/3215; H04L 9/0827; H04L 29/12066;
H04L 61/20; H04L 63/1408; H04L
63/1433; H04L 63/104; H04L 47/82;
H04L 61/4511; H04L 63/0428; G06F
21/455; G06F 21/30; G06F 16/245; G06F
16/90335; G06F 2221/2115; G06F
11/3604; G06F 16/2455; H04W 12/12;
H04W 48/16; H04W 12/08
See application file for complete search history.

(56) References Cited

U.S. PATENT DOCUMENTS

| | | | |
|---|---|---|---|
| 9,774,626 B1* | 9/2017 | Himler | H04L 63/1483 |
| 2006/0069697 A1* | 3/2006 | Shraim | H04L 63/1425 707/999.102 |
| 2011/0119331 A1* | 5/2011 | Zhang | H04L 67/2814 709/203 |
| 2011/0191832 A1* | 8/2011 | Davis | H04L 12/4641 709/206 |
| 2012/0210010 A1* | 8/2012 | Mensah | G06F 15/16 709/228 |
| 2017/0279681 A1* | 9/2017 | Vuolteenaho | H04L 43/50 |
| 2019/0158276 A1* | 5/2019 | Troutman | H04L 1/18 |
| 2019/0165991 A1* | 5/2019 | Cheng | H04L 41/0631 |

OTHER PUBLICATIONS

Anonymous: "Validating challenges from multiple network vantage points", Let's Encrypt Community Support, Aug. 25, 2017, pp. 1-1, XP055649814, Retrieved from the Internet: URL: ttps://community.letsencrypt.org/t/validating-challenges-from-multiple-network-vantage-points/40955 [retrieved on Dec. 5, 2019].
R. Barnes et al.: "Automatic Certificate Management Environment (ACME) draft--ietf--acme--15", Internet Draft: ACME Working Group, Internet Engineering Task Force (IETF), Standardworkingdraft, Internet Society (ISOC) University of Michigan, US, No. 15, Sep. 25, 2018, pp. 1-89, Chapter 10, XP015188688.
L. Dykcik et a.: "BlockPKI: An Automated, Resilient, and Transparent Public-Key Infrastructure", arxiv.org, Cornell University Library, 201 Olin Library Cornell University Ithaca, NY 14853, Sep. 25, 2018 (Sep. 25, 2018), pp. 1-10, XP080921043.
Toonk, A., CrossworkCloud, Hijack Event Today by Indosat, http://www.bgpmon.net/hijack-event-today-by-indosat (Nov.17, 2022).
Cowie, J., VantagePoint, The New Threat: Targeted Internet Traffic Misdirection, http://www.renesys.com/2013/11/mitm-internet-hijacking (Nov. 19, 2013).
Pakistan H., Pakistan Hijacks YouTube, Renesys Blog, http://www.renesys.com/blog/2008/02/pakistan_hijacks_youtube_1.shtml (Feb. 27, 2008).
AS Relationships Dataset—CAIDA, http://www.caida.org/data/active/as-relationships (Oct. 12, 2022).
Abadi M., Birrell A., Mironov I., Wobber T., Xie Y., Global Authentication in an Untrustworthy World., https://www.researchgate.net/publication/262276103 (May 2013).
Aifardan N. J., Paterson K. G., IEEE Symposium on Security and Privacy, Lucky Thirteen: Breaking the TLS and DTLS record protocols, https://ieeexplore.ieee.org/document/6547131, 526-540, ISBN 3-540-40674-3 (May 19-23, 2013).
Amann B., Vallentin M., Hall S., Sommer R., International Comuter Science Institute, Technical Report TR-12-014, Extracting Certificates from Live Traffic: A Near Real-Time SSL Notary Service, https://matthias.vallentin.net/papers/icsi-tr-12-014.pdf (Nov. 2012).
Anderson D., acmqueue, Splinternet Behind the Great Firewall of China, https://queue.acm.org/detail.cfm?id=2405036 (Nov. 30, 2012).
Aviram N., Schinzel S., Somorovsky J., Heninger N., Dankel M., Steube J., Valenta L., Adrian D., Halderman J A., Dukhovni V., et al., USENIX Security Symposium, DROWN: Breaking TLS Using SSLv2 689-706, https://www.usenix.org/system/files/conference/usenixsecurity16/sec16_paper_aviram.pdf (2016).
Ballani H., Francis P., Zhang X., ACM SIGCOMM Computer Communication Review, A Study of Prefix Hijacking and Interception in the Internet, 265-276 pages, https://doi.org/10.1145/1282380.1282411 (Oct. 2007).
Barker E., Roginsky A., Nist Special Publication, Transitions: Recommendation for Transitioning the Use of CryptographicAalgorithms and Key Lengths, https://www.nist.gov/publications/transitions-recommendation-transitioning-use-cryptographic-algorithms-and-key-lengths (Jan. 13, 2011).
Basin D., Cremers C., Hyuni-Jin T., Perrig A., Sasse R., Szalachowski P., IEEE Transactions on Dependable and Secure Computing, Design, Analysis, and Implementation of ARPKI: an Attack-Resilient Public-Key Infrastructure, https://ieeexplore.ieee.org/document/7547899 (Aug. 19, 2016).
Caida, Anonymized Internet Traces Dataset, https://www.caida.org/catalog/datasets/passive_dataset/ (Apr. 2008-Jan. 2019).
Cheval V., Ryan M., Yu J., University of Birmingham, United Kingdom, Loria, CNRS, France, DTKI: A new formalized PKI with no trusted parties, arXiv preprint arXiv:1408.1023, https://arxiv.org/pdf/1408.1023.pdf (Mar. 16, 2014).
Chung T., Rijswijk-Deij R., Chandrasekaran B. Choffnes D., Levin D., Maggs B.M, Mislove A., Wilson C., USENIX Security, A Longitudinal, End-to-End View of the DNSSEC Ecosystem, https://www.usenix.org/conference/usenixsecurity17/technical-sessions/presentation/chung (Aug. 16-18, 2017).
York, D., Internet Siciety, Email Hijacking—New Research Shows Why We Need DNSSEC Now!, https://www.internetsociety.org/blog/2014/09/email-hijacking-new-research-shows-why-we-need-dnssec-now/ (Sep. 14, 2014).
Dolev D., Dwork C., Waarts O., Yung M., Journal of the AMC, Perfectly Secure Message Transmission, https://doi.org/10.1145/138027.138036 (Jan. 2, 1993).
Durumeric Z., Wustrow E., Halderman J.A., USENIX Security Symposium, vol. 8. 47-53, ZMap: Fast Internet-wide Scanning and Its Security Applications, https://www.usenix.org/conference/usenixsecurity13/technical-sessions/paper/durumeric (Aug. 14-16, 2013).
Eckersley P., Electronic Frontier Foundation, Sovereign Keys: A Proposal to Make HTTPS and Email More Secure, https://www.eff.org/de/deeplinks/2011/11/sovereign-keys-proposal-make-https-and-email-more-secure (Nov. 18, 2011).
Eckersley P, Burns J., DEFCON'18, An Observatory for the SSLiverse, http://www.securitytube.net/video/3163 (Jul. 2010).
Gao H., Yegneswaran V., Chen Y., Porras P., Ghosh S., Jiang J., Duan X., SIGCOMM ACM, An Empirical Eeexamination of Global DNS Behavior 267-278, https://conferences.sigcomm.org/sigcomm/2013/papers/sigcomm/p267.pdf (Aug. 27, 2013).
Gilad Y., Herzberg A., ACM Transactions on Information and System Securityvol. 15 Issue 4, Fragmentation Considered Vulnerable, https://www.usenix.org/legacy/event/woot11/tech/final_files/Gilad.pdf (Apr. 2013).
Gill P., Schapira M., Goldberg S., SIGCOMM, Let the Market Drive Deployment: a Strategy for Transitioning to BGP Security, https://www.iab.org/wp-content/IAB-uploads/2013/06/itat-2013_submission_14.pdf (Aug. 27, 2013).
Gill P., Schapira M., Goldberg S., ACM SIGCOMM Computer Communication Review vol. 42 Issue 1, Modeling on quicksand: Dealing with the Scarcity of Ground truth in Interdomain Routing Data, https://people.cs.umass.edu/~phillipa/papers/QuickSand.pdf (Jan. 2012).
Gohring M., Shulman H., Waidner M., 38th IEEE International Conference on Distributed Computing Systems ICDCS 2018, Vienna, Austria, Path MTU Discovery Considered Harmful (Jul. 2-6, 2018).
Hao S., Zhang Y., Wang H., Stavrou A., USENIX—The Advanced Computing Systems, End-Users Get Maneuvered: Empirical Analy-

(56) References Cited

OTHER PUBLICATIONS sis of Redirection Hijacking in Content Delivery Networks, https://www.usenix.org/conference/usenixsecurity18/presentation/hao (Aug. 15-17, 2018).
Heninger N., Durumeric Z., Wustrow E., Halderman J. A., The 21st USENIX Security Symposium (USENIX Security 12) 205-220, Mining your Ps and Qs: Detection of widespread weak keys in network devices, https://wvww.usenix.org/conference/usenixsecurity12/technical-sessions/presentation/heninger (Aug. 8-10, 2012).
Herzberg A., Shulman A., Security of Patched DNS, European Symposium on Research in Computer Security, https://doi.org/10.1007/978-3-642-33167-1_16 (May 23, 2012).
Herzberg A., Shulman A., Communications and Network Security, Fragmentation considered poisonous,One-domain-to-rule-them-all.org, https://ieeexplore.ieee.org/abstract/document/6682711 (May 17, 2012).
Herzberg A., Shulman A., ACM Annual Computer Security Applications Conference (ACMACSAC), Socket Overloading for Fun and Cache Poisoning, https://www.researchgate.net/publication/262245537 (Dec. 2013).
Herzberg A., Shulman A., Computer Security—ESORICS 2013—18th European Symposium on Research in Computer Security, Egham, UK, Vulnerable Delegation of DNS Resolution, Proceedings 219-236, https://doi.org/10.1007/978-3-642-40203-6_13 (Sep. 9-13).
Holz R., Braun L., Kammenhuber N.,Carle G., Proceedings of the 2011 ACM SIGCOMM conference on Internet measurement conference. ACM, 427-444, The SSL Landscape: A Thorough Analysis of the x.509 PKI Using Active and Passive Measurements, https://dl.acm.org/doi/10.1145/2068816.2068856 (Nov. 2011).
Hu M., Wash. & Lee L. Rev. 72, 1679-1989, Taxonomy of the Snowden Disclosures, https://scholarlycommons.law.wlu.edu/wlulr/vol72/iss4/4/ (2015).
Kaminsky D., IO Active, Black Hat conference, It's the End of the Cache As We Know It, http://www.blackhat.com/presentations/bh-jp-08/bh-jp-08-Kaminsky/BlackHat-Japan-08-Kaminsky-DNS08-BlackOps.pdf (2008).
Kernel.org. Linux Kernel Documentation, http://www.kernel.org/doc/Documentation/networking/ip-sysctl.txt (2011).
Hyun-Jin Kim T., Huang L., Perring A., Jackson C., Gligor V., Proceedings of the 22nd international conference on World Wide Web, ACM, 679-690, Accountable Key Infrastructure (AKI): A Proposal for a Public-Key Validation Infrastructure, https://dl.acm.org/doi/abs/10.1145/2488388.2488448 (May 2013).
Klein A., Shulman H., Waidner M., The 47th IEEE/IFIP International Conference on Dependable Systems and Networks (DSN), Counting in the Dark: Caches Discovery and Enumeration in the Internet, https://ieeexplore.ieee.org/document/8023137 (Jun. 26-29, 2017).
Klein A., Shulman H., Waidner M., IEEE InfoCom, Internet-Wide Study of DNS Cache Injections, https://publica.fraunhofer.de/entities/publication/cbcbbe21-a9f5-441c-aa24-a3eebbc20c75/details (2017).
Knockel J., Crandall J.R., FOCI, Counting Packets Sent Between Arbitrary Internet Hosts, https://www.cs.unm.edu/~crandall/foci2014.pdf (2014).
Laurie B., Langley A., Kasper E., Technical Report, Certificate transparency, https://datatracker.ietf.org/doc/active/ (Oct. 4, 2013).
Schomp K. Callahan T., Rabinovich M., Allman M., Proceedings of the 2013 conference on Internet measurement conference. ACM, 77-90, On Measuring the Client-Side DNS Infrastructure, https://dl.acm.org/doi/10.1145/2504730.2504734 (Oct. 2013).
Goldberg S., The myetherwallet.com hijack and why it's risky to hold cryptocurrency in a webapp, https://medium.com/@goldbe/the-myetherwallet-com-hijack-and-why-its-risky-to-hold-cryptocurrency-in-a-webapp-261131fad278 (2018).
Shulman H., Waidner M., Applied Cryptography and Network Security (ACNS) Lausanne, Switzerland. Springer., Fragmentation Considered Leaking: Port Inference for DNS Poisoning, https://link/springer.com/chapter/10.1007/978-3-319-07536-5_31 (2014).
Shulman H., Waidner M., European Symposium on Research in Computer Security. Springer, 3-22, Towards Security of Internet Naming Infrastructure, https://link.springer.com/chapter/10.1007/978-3-319-24174-6_1 (2016).
Shulman H., Waidner M., USENIX, the Advanced Computing Systems Association, One Key to Sign Them All Considered Vulnerable: Evaluation of DNSSEC in the Internet, https://www.usenix.org/conference/nsdi17/technical-sessions/presentation/shulman (Mar. 27-29, 2017).
Son S., Shmatikov V., Security and Privacy in Communication Networks Springer, 466-483, The Hitchhiker's guide to DNS Cache Poisoning, https://link.springer.com/chapter/10.1007/978-3-642-16161-2_27 (2010).
Szalachowski P., Matsumoto S., Perrig A., Proceedings of the 2014 ACM SIGSAC Conference on Computer and Communications Security, ACM, 406-417, PoliCert: Secure and flexible TLS certificate management, https://dl.acm.org/doi/10.1145/2660267.2660355 (Nov. 2014).
Wendlandt D., Andersen D. G., Perrig A., USENIX Annual Technical Conference, vol. 8. 321-334, A.Perspectives: Improving SSH-style Host Authentication with Multi-Path Probing, https://www.usenix.org/legacy/event/usenix08/tech/full_papers/wendlandt/wendlandt.pdf (2008).
Yang H., Osterweil E., Massey D., Lu S., Zhang L., Dependable and Secure Computing, IEEE Transactions on 8, 5 (2011), 656-669, Deploying Cryptography in Internet-Scale Systems: A Case Study on DNSSEC, https://ieeexplore.ieee.org/abstract/document/5444890 (Sept.-Oct. 2011).

\* cited by examiner

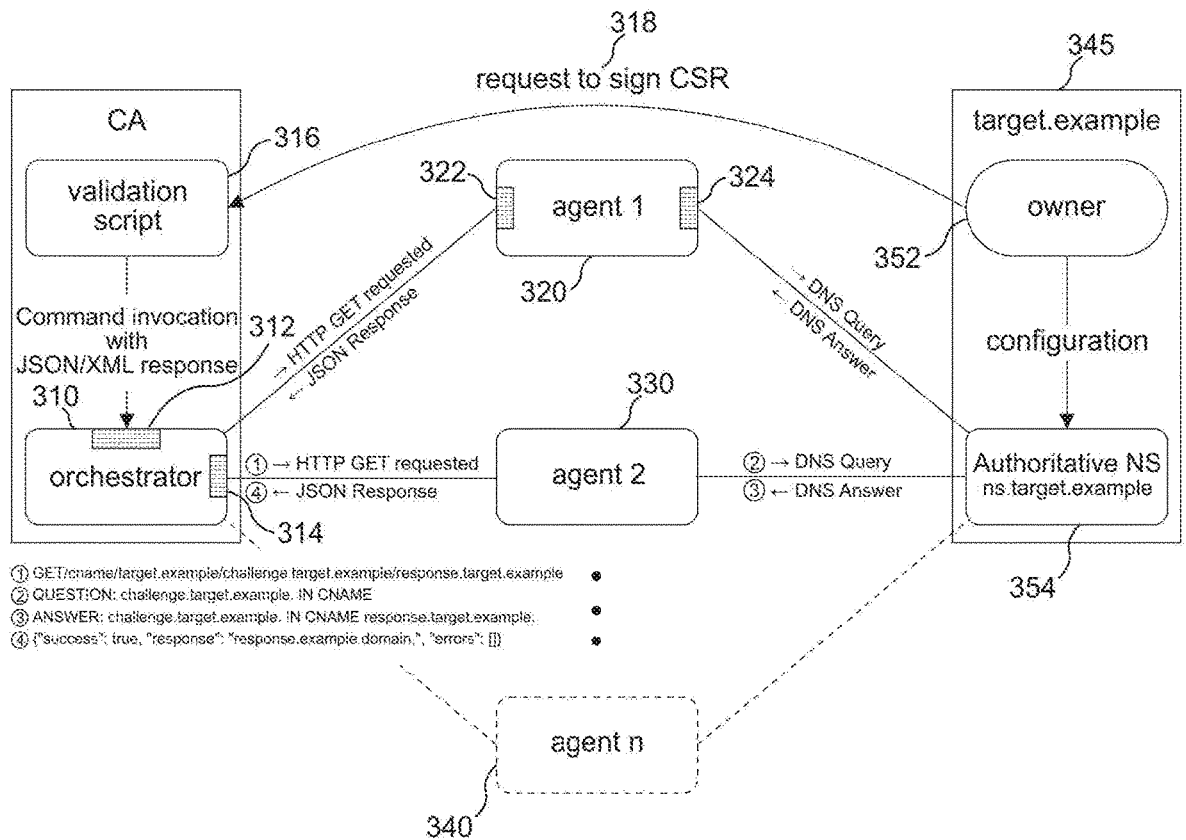
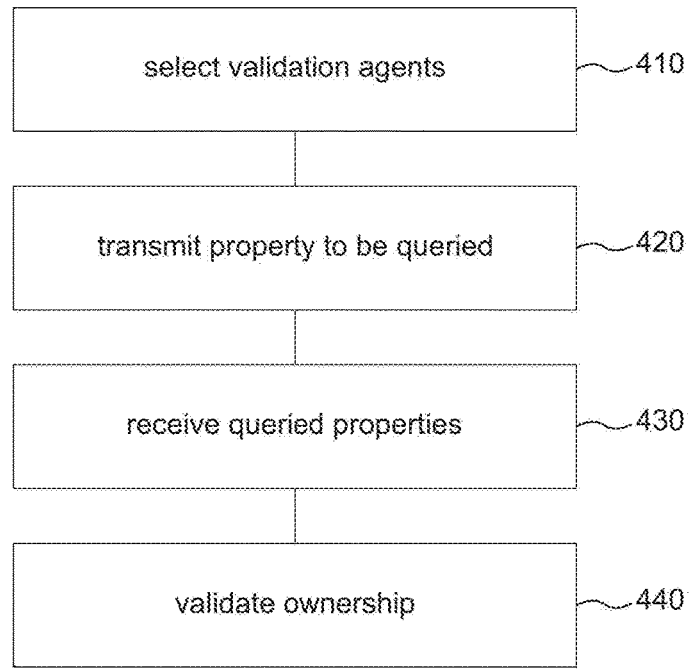
Fig. 4

METHOD FOR VALIDATING OWNERSHIP OF A RESOURCE WITHIN A NETWORK, COORDINATING AGENT AND VALIDATION AGENT

FIELD

Examples relate to methods for validating ownership of a resource within a network and to validation agents and a coordinating agent to perform the method.

BACKGROUND

There often is demand to evaluate ownership of a resource within a network. For example, Certification Authorities (CAs) often require to evaluate whether a user requesting a certificate (e.g. by submitting a Certificate Signing Request, CSR) is the rightful owner of the domain the certificate is to be issued for. Such evaluation is often performed by means of Domain Validation (DV), which assumes that only the rightful owner of the domain is able to create specific records within the Domain Name Services (DNS) of the domain or only the rightful owner has the ability to create files within the file system or directory accessible via the domain. While different DV methods may exist, such as, for example, E-Mail Based DV, WHOIS-Based DV, DNS-Based DV or HTTP/S-Based DV, all of those rely on DNS to validate the domain. To the extent DNS is vulnerable to malicious attackers, also DV is vulnerable and there may be a possibility to obscure domain validation such that attackers other than the rightful owners of the domain may receive a certificate for the domain. For example, the responses of the Domain Name Servers of the domain may be attacked to make the DNS resolvers of the CA receive a wrong I.P. address so as to perform the validation using an I.P. address under the control of an attacker instead of using an I.P. address of the rightful owner of the domain. Similarly, a Man in the Middle attack, where an attacker controls a node on the network route between the CA and the entities of the Domain (or even the whole network the CA or the Domain is hosted in), may result in a compromised validation of the domain or resource.

Hence, there may be a demand to increase the security of the methods to validate ownership of a resource within a network. Said object is achieved by the methods and apparatuses of the independent claims.

SUMMARY

An example of a method to validate ownership of a resource within a network comprises selecting a group of at least two validation agents such that network routes between a validation agent of the group and entities of a group of one or more entities associated to the resource do not intersect. A property of the resource to be validated and an address indicator for the resource are transmitted from a coordinating agent to the group of validation agents. The method further comprises querying the property of the resource from an entity using the validation agents of the group to determine queried properties; and evaluating the queried properties to validate ownership of the resource. Selecting the validation agents such that network routes between the validation agents of the group and the entities from which the property of the resource is queried do not intersect may assure that even if a hop or node along a single network route is compromised, the remaining validation agents will receive valid results from their queries. Depending on the resource and the property to be queried, the entity from which the property is queried may be the resource itself, for example if the resource is a server within the network and the property to be queried is the existence of a particular file in the servers file system. In other implementations, the entity may not be the resource itself but associated to the resource such that only the rightful owner of the resource can alter or provide certain properties related to the resource on the entity. For example, if the resource is a domain, a particular property to be queried may be a CNAME entry in the domain name system which may typically be queried from multiple domain name servers which may be different than servers hosting, for example, the file system of an internet access of the domain. While the physical resources of a domain may be distributed, only the rightful owner of the domain is assumed to have the capability to alter the CNAME entry (the property) of the domain on the entities to be queried, e.g. the nameservers.

According to further examples, the group of validation agents is further selected such that the at least two validation agents are located in different operator networks. Such a selection of the validation agents may assure that even a large-scale attacker who may have control over entire operator networks may not be able to obscure the queries of all validation agents.

An example of a coordinating agent comprises a first communication interface for a validation service, the first communication interface being configured to receive information on a resource within a network and a property of the resource. By means of the first interface, the coordinating agent receives the resource for which ownership is to validate and, by means of the property, the information to query from the resource. During evaluation of the queries, it is assumed that only the rightful owner of the resource can give the resource the property to be queried. The coordinating agent also comprises a second communication interface for validation agents, the second communication interface being configured to transmit an address indicator for the resource to a group of available agents and to receive network routes between the available agents and entities of a group of one or more entities associated to the resource. The address indicator allows the available agents to identify and access the resource and to establish a network route to the resource. An example for an address indicator is a domain name which can be resolved into an I.P. address. Alternatively, an I.P. address may directly be transmitted as an address indicator. Networks using other protocols than the Internet Protocol may likewise use other address indicators which allow an available agent to access a resource. Having the capability to receive the network routes from the available agents may allow to determine whether the corresponding available agent is suited for querying the resource, which so becomes a member of a smaller group of validation agents.

An example of a method to validate ownership of a resource within a network, which may be performed at a coordinating agent, may, therefore, comprise selecting a group of at least two validation agents such that network routes between a validation agent of the group and entities of a group of one or more entities associated with the resource do not intersect. Non-intersecting network routes are routes through the network that do not have a single hop (visiting node) in common. The method further comprises transmitting a property of the resource to be queried to the validation agents and receiving queried properties from the validation agents. The ownership of the resource is validated based on the queried properties. By selecting the group of two or more validation agents according to the previously discussed criteria, one may assure that validation is reliable even in the event that attackers are present within the network which gained control of one or more hops on one ore more network routes between validation agents and entities of the group.

An example of a validation agent comprises a first communication interface for a coordinating agent, the first communication interface being configured to receive an address indicator for a resource in a network and a property of the resource. A second communication interface is configured to establish network routes to entities of a group of one or more entities associated to the resource. The first communication interface is further configured to transmit the network routes to the coordinating agent. Having the capability to transmit the network routes to the coordinating agent may allow the agent to become a validation agent in a group of validation agents that jointly query properties of a resource with a low probability that the queries of a major part of the validation agents are compromised by an attacker.

BRIEF DESCRIPTION OF THE FIGURES

Some examples of apparatuses and/or methods will be described in the following by way of example only, and with reference to the accompanying figures, in which

FIG. 3 illustrates an example of the system for validating ownership of a resource within a network, the system comprising a coordinating agent and at least two validation agents; and FIG. 4 illustrates a further example of a method for validating ownership of a resource within the network.

DETAILED DESCRIPTION

Figure 1:
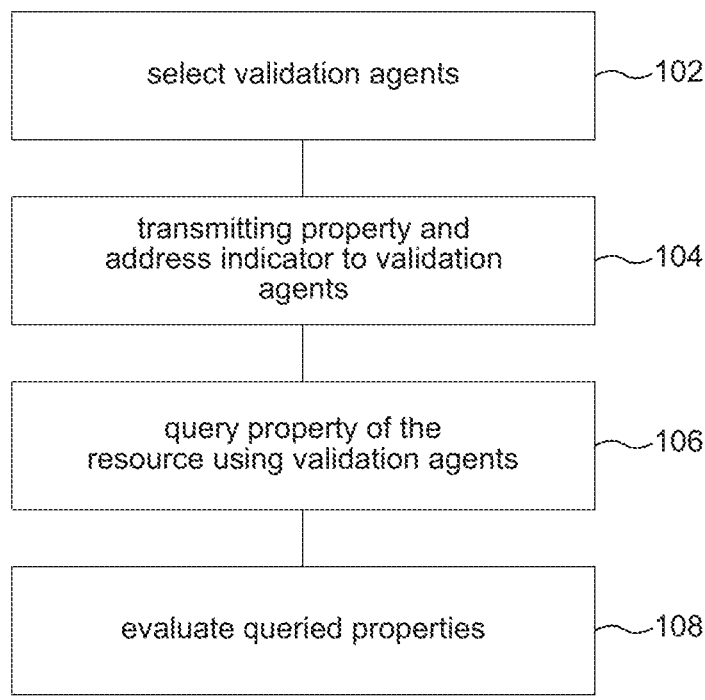
FIG. 1 illustrates a flowchart of an example of a method to validate ownership of a resource in a network.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

The subsequent examples will mainly describe the validation of ownership for a Domain in the Internet as a particular example for a resource within a network. However, further implementations may likewise serve to validate ownership of other resources within a network, such as for example within the Internet. The Internet is just one example for a network comprising individual resources, e.g. single network nodes, which can be accessed by different data communication protocols, such as for example by the Internet Protocol. Routing within the Internet may be performed based on the Internet Protocol Address of an individual resource. As an alias to the Internet protocol address, names may be used, which are, typically, translated into IP addresses (resolved) by name services accessible within the network. A network may, like the Internet, be divided into multiple different operator networks that are operated by different legal entities. The operator networks have interfaces to one another. Network routes may connect one operator network to one or more further operator networks. An operator network may, for example, be a network comprising a block of IP addresses assigned to one legal entity (or governments or similar entities) which has the right to use the block of IP addresses and to establish a physical network using the IP addresses. In other words, the global Internet may be constituted of multiple different operator networks which interface to other operator networks to allow to establish network routes from one device in a first operator's network to another device in a second operator's network.

FIG. 1 illustrates a flowchart of an example of a method to validate ownership of a resource in a network. Since the method operates within a network of distributed entities, the example of the method illustrated in FIG. 1 is described together with FIG. 2, which illustrates an example for a network.

Figure 2:
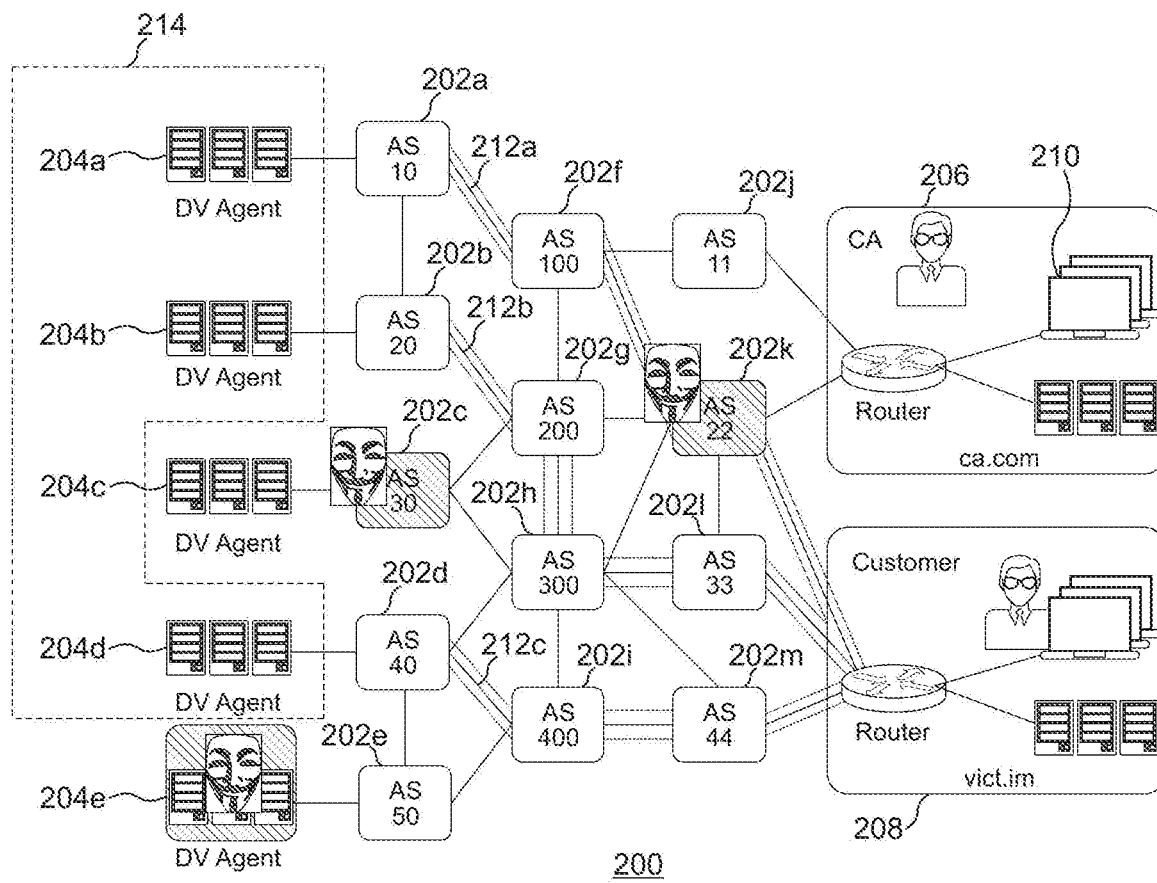
FIG. 2 illustrates an example of a network comprising multiple operator networks and validation agents.

The method comprises selecting 102 a group of at least two validation agents such that network routes between a validation agent of the group and entities of a group of one or more entities associated to the resource do not intersect. As illustrated in FIG. 2, the network 200 may comprise multiple different operator networks 202a to 202m. Multiple validation agents may be distributed arbitrarily amongst the operator networks. In the particular example illustrated in FIG. 2, it is assumed that available agents 204a to 204e are present within operator networks 202a to 202e, respectively. An available agent may be implemented as a software component running on a computer or on a processing entity within an operator network. Likewise, an available agent may also be implemented as a hardware entity designed to perform the functions of a validation agent as described below. A validation agent is an available agent that has been selected using the criterion that network routes between a validation agent of the group of validation agents and entities of a group of one or more entities associated to the resource do not intersect. The validation agent has the capability to establish a network route to an entity to be queried about a property of a resource within the network and to query the property once the network route has been established. FIG. 2 illustrates an application where ownership of a domain is to be validated, for example by querying a CNAME record from the name servers within the domain. In the example of FIG. 2, a certification authority (CA) 206 having that domain CA.com is to verify ownership of the domain vict.im of a customer 208. To this end, selected validation agents are to query name servers within domain vict.im for the CNAME record.

Within the network of the CA, a coordinating agent 210 is used to coordinate the use of the group 214 of validation agents 204a, 204b, and 204c selected from the group of available agents 204a to 204e such that network routes between a validation agent 204a, 204b, and 204c of the group 214 and entities of a group of one or more entities associated to the resource do not intersect. Assuming, for simplification reasons, that a single domain name server is present within domain 200a network routes 212a, 212b, and 212c fulfill this criterion, leading to the selection of the validation agents 204a, 204b, and 204c of the group 214.

To enable the validation agents 204a, 204b, and 204c of the group 214 to query the property of the resource and to establish network routes to entities associated with the resource, the method of FIG. 1 further comprises transmitting 104 a property of the resource to be validated and an address indicator for the resource from a coordinating agent to the group of validation agents.

The method further comprises querying 106 the property of the resource 208 from at least one entity using the validation agents 204a, 204b, and 204c of the group 214 to determine queried properties.

Further, the method comprises evaluating 108 the queried properties to validate ownership of the resource. Selecting the validation agents such that network routes between the validation agents of the group and the entities from which the property of the resource is queried do not intersect may assure that even if a hop or node along a single network route is compromised, the remaining validation agents will receive valid results from their queries. For example, FIG. 2 assumes that operator network 202k is under control of a malicious attacker which may corrupt the query, for example, by directing the query to another network than the one of the rightful owner of the domain 208. While network route 212a is compromised, network routes 212b and 212c are not compromised so that validation agents 204b and 204d receive uncorrupted results of the query, leading to a reliable validation of ownership for domain 208.

While a minimum number of at least two validation agents may be required to be sensitive to a malicious attacker, the number of validation agents within the group may be chosen arbitrarily and, for example, coordinated by the coordinating agent 210. Depending on the network topology, already a number of three appropriately selected validation agents may be sufficient to arrive at the reliability of a validation beyond 90%. Further implementations, however, may also use higher numbers, such as for example four, five, six, seven, or eight validation agents.

According to further examples of the method, the group of validation agents is further selected such that the at least two validation agents are located in different operator networks. An example for such implementation is already illustrated in FIG. 2. Such a selection of the validation agents may assure that even a large-scale attacker who may have control over entire operator networks hosting a chosen validation agent (for example operator network 202e of FIG. 2) may not be able to obscure the queries of all validation agents.

According to some examples, the ownership of the resource is confirmed if a pre-determined fraction of the queried properties correspond to or equal an expected property. If for example, in the environment of FIG. 2, two out of three validation agents result with the CNAME entry that is expected to be created in the domain name service for domain 208 by its rightful owner, one can conclude, that validation is successfully performed. A preceding evaluation of the network topology may serve to assure that the likelihood that a single attacker can control hops or operator networks along more than one route is negligible. If, for example, the owner of a domain created the CNAME entry "success" (which is the expected property) and two out of three CNAME queries result with the entry "success", successful validation may be assumed.

As already elaborated on above, according to some examples, selecting the group of at least two validation agents comprises transmitting an address indicator for the resource 208 from the coordinating agent 210 to a group of available agents 204a to 204e and using the address indicator to determine a group of one or more entities associated to the resource. Further, the method comprises transmitting network routes between the available agents 204a to 204e of the group and the entities associated to the resource 208 to the coordinating agent 210. Even in the event of a single entity, the number of network routes transmitted by each available agent may be greater than one due to the possibility that the dynamic routing within the network provides for different network routes at different attempts to access the single entity. Further examples may be restricted to a single attempt to access an entity per available agent resulting with a single network route transmitted for each available agent 204a to 204e. If, however, there is more than one entity associated to the resource, which is normally the case in the event of name servers (one domain typically uses more than one name server for DNS resolution), multiple network routes may be transmitted for each available agent that establishes network routes to different entities.

The selection process is finalized by selecting the group of at least two validation agents at the coordinating agent based on the network routes such that the resulting validation agents fulfill the requirement that network routes between the validation agents of the group and the entities from which the property of the resource is queried do not intersect.

According to some examples, a communication between the coordinating agent and the validation agents is encrypted to enhance security, for example, by means of HTTPS.

While FIG. 2 illustrates a domain as a particular example for a resource, further examples may validate other resources, such as for example an IP Address, an E-Mail Server, or a device.

FIG. 3 illustrates an example of a system for validating ownership of a resource within a network, the system comprising a coordinating agent 310 and at least two validation agents 320 and 330. Like FIG. 2, the system of FIG. 3 uses domain validation as a particular example for the validation of ownership of a resource within the network.

The coordinating agent 310 comprises a first communication interface 312 for a validation service, the first communication interface 312 being configured to receive information on a resource 345 within a network and a property of the resource 345 to be queried. The coordinating agent 310 further comprises a second communication interface 314 for validation agents, the second communication interface 314 being configured to transmit an address indicator for the resource 345 to a group of available agents 320, 330, and 340 and to receive network routes between the available agents 320, 330, and 340 and entities 354 of a group of one or more entities associated to the resource 345. In the event of domain validation, the address indicator may be the main domain name and the property may be the entry of a CNAME record, for example. The first communication interface 312 is configured to receive the information used for the validation from the validation service 316. In the example of FIG. 3, a certification authority is assumed to be the validation service 316, which may, for example, issue a validation request upon reception of a request of an owner 352 of a domain for signing a certificate for the domain (Certificate Signature Request 318).

To select the validation agents according to the previously discussed criteria, the coordinating agent 310 further comprises selection circuitry configured to select a group of least two validation agents from the group of available agents based on the received network routes.

The second communication interface 314 is further configured to transmit the property of the resource 345 to the validation agents and to receive queried properties from the validation agents once the group of validation agents has been established.

Evaluation circuitry within the coordinating agent 310 is configured to conclude on successful validation of the resource if a predetermined fraction of the queried properties corresponds to an expected property, e.g. to an expected content of a CNAME record of the DNS Server.

To submit the result of the validation to the requesting validation service 316, the first communication interface 312 is further configured to indicate successful or unsuccessful validation to the validation service 316. Both the coordinating agent and the validation agents may be implemented in hardware or in software.

As further illustrated in FIG. 3, an example of a validation agent 320 comprises a first communication interface 322 for a coordinating agent, the first communication interface 322 being configured to receive the address indicator for the resource 345 in the network and the property of the resource to be queried by the validation agent 320. A second communication interface 324 is configured to establish a network route to entities 354 of a group of one or more entities associated to the resource 345. To be able to provide a selection criterion to the coordinating agent 310, the first communication interface 322 is further configured to transmit network routes to the coordinating agent 310. The network routes may, for example, be determined by the validation agent 320 using traceroute or similar tools or methods. Likewise, the coordinating agent 310 may be capable to detect in which operator network it resides to transmit the information to the coordinating agent 310 as a further selection criterion. Alternatively, the coordinating agent 310 may be capable to determine in what operator network an available agent resides, for example bay means of its I.P. address.

The second communication interface may further be configured to query the property of the resource 345 from an entity 354 of the group to determine a queried property once the validation agent has been selected for querying by the coordinating agent 310. Likewise, the first communication interface 322 may be further configured to submit the queried property to the coordinating agent 314. To further increased security, a communication between the coordinating agent 310 and the validation agent 320 may be encrypted, i.e., second communication interface 314 of the coordinating agent 310 and first communication interface 322 of validation agent 320 may interchange encrypted messages, for example by means of HTTPS. In the event of domain validation, for example, communication on the second communication interface 324 of validation agent 320 may be unencrypted, however, since communication with domain name servers may be required to be unencrypted.

In other words, a system for validating ownership of a resource within a network, comprises a coordinating agent 310, a first validation agent 320, and a second validation agent 330.

In some embodiments, the first validation 320 agent is located within a first operator network, and wherein the second validation agent 330 is located within a second operator network.

In some embodiments, the coordinating agent 310 is located within the network of a Certification Authority.

FIG. 4 illustrates a further example of a method for validating ownership of a resource that may, for example, be performed within a coordinating agent 310.

The method comprises selecting 410 a group of at least two validation agents such that network routes between a validation agent of the group and entities of a group of one or more entities associated with the resource do not intersect. Further, the method comprises transmitting 420 a property of the resource to be queried to the validation agents.

The method further comprises receiving 430 queried properties from the validation agents; and validating 440 the ownership of the resource based on the queried properties according to, for example, the criteria elaborated on before.

While querying CNAME entries of a domain has been predominantly used as an example of a property queried during domain validation, also other properties may be queried in further implementations since there exist a number of methods for performing DV.

Email-Based DV. Upon filling out a CSR, an email is issued to the administrative contact of the domain selected by the applicant out of email addresses registered for that domain in Whois. The email typically contains validation code and link, which the recipient has to click and enter the code to prove control over the domain. If the correct code is entered the code proceeds with the certificate issuance.

WHOIS-Based DV. Similar to email-based DV, except that the client cannot select which email (out of those registered as administrative for the domain) will be used in the validation. During the DV procedure the CA selects itself the email address and can use any Admin, Registrant, Tech or Zone contact email address that appears in the domain's WHOIS record.

DNS-Based DV. Upon submitting a CSR, a hash value is provided which has to be entered as a DNS CNAME Resource Record (RR) for the domain in the zonefile. For example, assume that applicant's domain is vict.im and CAs domain is ca-domain.com. A CNAME record may be hash1.www.vict.im. CNAME hash2.ca-domain.com. The DNS resolver of the CA queries the domain of the applicant and checks the presence of the CNAME record. If the correct record is present, the CA proceeds to issue the requested certificate.

HTTP/S-Based DV. Upon the submission of a CSR, a hash value is returned to the client. A file should be created and placed at the root of the web server with the hash value as its name, as follows: http://www.vict.im/hash-value1.txt. The content of the file should contain hash-value2 and the domain ca-domain.com. The CA makes an HTTP/HTTPS request to retrieve the file. If correct, the CA proceeds to issue the certificate.

In summary, examples described herein may preserve the benefits of DV while providing resilience against MitM attackers. Therefore, examples of the present disclosure may also be referred to as DV++. The integration of the new examples into conventional systems do not require any changes to the CA infrastructure and functionality, so that use of examples by a CA comes at low cost and effort. One aspect of the examples is to utilize distributed nodes (validation agents) which perform DV from multiple vantage points. The security against MitM attackers is achieved by placing the nodes in different networks, which do not traverse overlapping paths.

In contrast to a cryptographic eavesdropping attacker, which is a global eavesdropper, a realistic MitM attacker can be present only on some (operator) networks but does not control the entire Internet. The attacker may be a malicious ISP that passively collects the traffic that traverses its operator networks. An attacker can also actively try to attract traffic from other networks by performing BGP prefix hijacking. The examples described herein (DV++) provide a decentralized mechanism, that may utilize the existing Internet infrastructure to validate claims of domain ownership. In contrast to the centralized validation performed by the CAs with conventional DV, DV++ is based on a flat hierarchy with several equally trusted certification agents. To pass a validation, domain owners must prove their ownership to a majority of the agents, e.g. in a fully automated manner, by responding to queries sent by the (validation) agents for the resource records in the domain. The (validation) agents are synchronized with a coordinating agent, which is also referred to as orchestrator module. The orchestrator may be located on the CA network. The orchestrator and the agents may use HTTPS for their mutual communication. During the domain validation process, all the agents receive from the orchestrator the domain and the record that need to be queried. The agents send DNS requests to the nameservers in the domain requesting the record. As soon as the response arrives, the agent sends the response to the orchestrator. If, for example, more than 50% of the responses arrive, and they match, the orchestrator returns success otherwise failure. The number of the correct responses from the agents is a parameter that the CA can configure.

When sending a DNS request, each agent selects independently a source port at random as well as a random TXID. To launch a successful attack the attacker has to spoof correct responses to more than 50% of the agents. This is an impossible task even for strong, nation state attackers. The agents may be configured on different physical availability networks of AWS cloud. The selection of the cloud networks is done so that the agents are located in different networks, whose routes do not intersect. For selecting the networks to place the agents one may use an empirically derived CAIDA AS-level graph from 2016. Similar to DV, DV++ authentication is initiated by the CA following a submission of a CSR by the applicant. During this process, queries are sent to the agents that perform look-ups in the target domain. Once majority of the responses are received by the orchestrator, they are processed.

Even if the attacker can corrupt some agents, controls some networks or path, it cannot control all the paths and all the networks in the Internet and cannot corrupt all the agents. For instance, even strong nation state attackers, such as security agencies, do not control all Internet networks and paths.

If one considers an attacker that tries to pass the authentication of DV++ to issue a fraudulent certificate. To succeed, the attacker must provide correct spoofed responses for the majority of the DNS requests issued by the DV++ agents.

If the attacker is located on a network of the victim nameserver, it can hijack requests on the network of the nameserver and send spoofed responses to the DV++ agents. Luckily, domains have more than one nameserver and the nameservers are placed in different networks; this is following best practices to avoid a single point of failure for domains. Measurements of 1M-top Alexa domains show that an average number of nameservers per domain is 5, and minimal is 2. Furthermore, the nameservers belonging to the same domain are hosted in different networks. This ensures that the attacker cannot hijack and replace responses from all the nameservers.

Considering a passive MitM attacker, which controls a large ISP, and an active attacker, which also additionally attempts to attract traffic from other networks proves robustness of the validation as described herein. Using a different number of agents, one can demonstrate that even 3 agents in networks of top-tier ISPs suffice to provide strong security guarantees against MitM attackers.

Further than for the previously presented use cases, further examples of the disclosure contained herein (DV++) can be used to bootstrap other mechanisms with security. For instance, attacks may apply against password recovery procedures in popular web services. In password recovery procedure the password or a link to reset the password is sent back to the email that initiated the password recovery. If the DNS resolver on the network of the service is attacked, and caches an incorrect record (mapping the email of the victim to an IP address controlled by an attacker) the password would be sent to the attacker. DV++ can be used by the web services, to validate the DNS record of the email requesting the password recovery, hence blocking malicious requests that do not pass the verification of DV++.

The aspects and features mentioned and described together with one or more of the previously detailed examples and figures may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method to validate ownership of a resource within a network, comprising:
    selecting a group of at least two validation agents such that network routes between each validation agent of the group of at least two validation agents and entities each entity of a group of one or more entities associated to the resource do not intersect;
    transmitting a property of the resource to be validated and an address indicator for the resource from a coordinating agent to the group of at least two validation agents;
    querying the property of the resource from each entity of the group of one or more entities using the group of at least two validation agents to determine queried properties; and
    evaluating the queried properties to validate ownership of the resource.

2. The method of claim 1, wherein the group of at least two validation agents is selected such that the at least two validation agents are located in different operator networks.

3. The method of claim 1, wherein ownership of the resource is confirmed if a predetermined fraction of the queried properties corresponds to an expected property.

4. The method of claim 1, wherein selecting the group of at least two validation agents comprises:
    transmitting an address indicator for the resource from the coordinating agent to a group of available validation agents;
    using the address indicator to determine the group of one or more entities associated to the resource;
    transmitting network routes between [[the]] each of the available validation agents and each of the group of one or more entities from the available validation agents to the coordinating agent; and
    selecting the group of at least two validation agents at the coordinating agent based on the network routes.

5. The method of claim 1, wherein a communication between the coordinating agent and the group of at least two validation agents is encrypted.

6. The method of claim 1, wherein the resource is one of a Domain, an IP Address, an E-Mail Server, and a device.

7. A coordinating agent, comprising:
    a first communication interface for a validation service, the first communication interface being configured to receive information on a resource within a network and a property of the resource;
    a second communication interface for validation agents, the second communication interface being configured to transmit an address indicator for the resource to a group of available validation agents and to receive network routes between each of the available validation agents and each entity of a group of one or more entities associated to the resource; and
    selection circuitry configured to select a group of at least two validation agents from the group of available validation agents based on the received network routes such that network routes between each validation agent of the group of at least two validation agents and each entity of the group of one or more entities associated to the resource do not intersect.

8. The coordinating agent of claim 7, wherein the second communication interface is further configured to transmit the property of the resource to the group of at least two validation agents and to receive queried properties from the group of at least two validation agents.

9. The coordinating agent of claim 7, further comprising:
evaluation circuitry configured to conclude on successful validation of the resource if a predetermined fraction of the queried properties corresponds to an expected property.

10. The coordinating agent of claim 9, wherein the first communication interface is further configured to indicate successful or unsuccessful validation to the validation service.

11. A method for validating ownership of a resource within a network, comprising:
selecting a group of at least two validation agents such that network routes between each validation agent of the group of at least two validation agents and each entity of a group of one or more entities associated with the resource do not intersect;
transmitting a property of the resource to be queried to the group of at least two validation agents;
receiving queried properties from the group of at least two validation agents; and
validating the ownership of the resource based on the queried properties.

12. A non-transitory computer readable storage medium comprising computer program code stored, when executed by a programmable processor, perform a method to validate ownership of a resource within a network, the method comprising:
selecting a group of at least two validation agents such that network routes between each validation agent of the group of at least two validation agents and each entity of a group of one or more entities associated to the resource do not intersect;
transmitting a property of the resource to be validated and an address indicator for the resource from a coordinating agent to the group of at least two validation agents;
querying the property of the resource from the group of one or more entities using the group of at least two validation agents to determine queried properties; and
evaluating the queried properties to validate ownership of the resource.

* * * * *